Feb. 9, 1960
J. E. BROOK
2,924,386
ALGEBRAIC COMPUTERS
Filed July 17, 1953
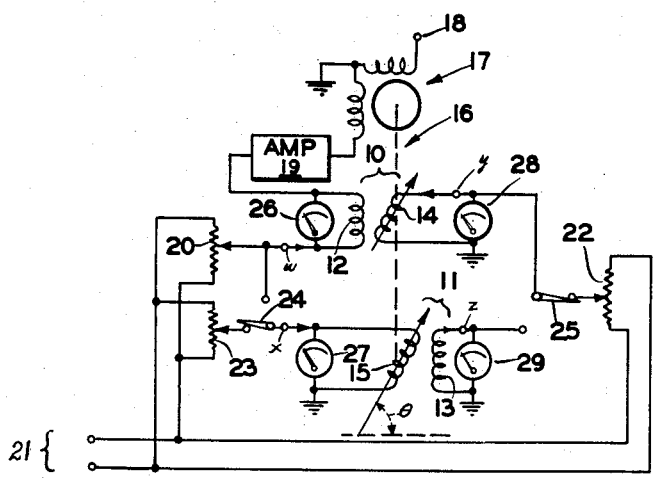
FIG. 1
FIG. 3
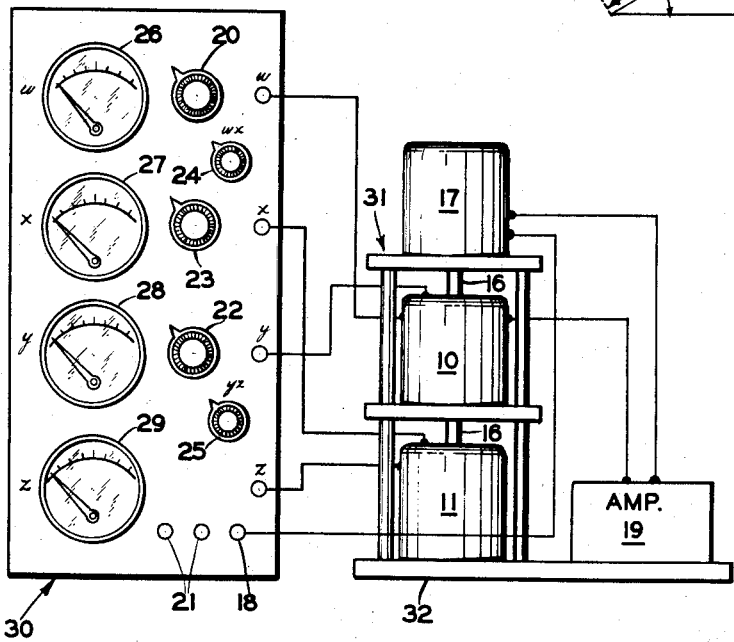
FIG. 2
INVENTOR.
JAMES E. BROOK
BY
Geo J Hyde
ATTORNEY United States Patent Office 2,924,386
Patented Feb. 9, 1960

2,924,386

ALGEBRAIC COMPUTERS

James Edward Brook, Hackensack, N.J., assignor to Bendix Aviation Corporation, Teterboro, N.J., a corporation of Delaware Application July 17, 1953, Serial No. 368,593

17 Claims. (Cl. 235—195)

This invention relates to electrical computing apparatus and is particularly directed to an arrangement capable of computing the numerical values of basic algebraic expressions of the type which occurs frequently in engineering and scientific equations and formulas.

The general purpose is to provide an electrical circuit arrangement that will compute such values directly and without approximations, and specifically the value of the expressions $wx$, $wx/y$, $x/y$, $x^2$, $x^2/y$, $1/y$, $\sqrt{x}$, and $\sqrt{wx}$.

A further object is to utilize in a novel way for computation purposes the mathematical relationship between the voltages in the windings of a variable transformer in which one winding is rotatable relative to the other.

Another purpose is to provide an arrangement of the indicated type that is simple and compact and which utilizes only standard types of apparatus, whose operation is reliable and well understood.

These and other objects, purposes, and advantages of the invention will appear more fully from the following detailed description, considered in conjunction with the accompanying drawing, in which one embodiment of the invention is illustrated. It is to be expressly understood, however, that the drawing is for purposes of illustration and description and is not to be construed as defining the limits of the invention.

In the drawing:

Fig. 1 is a schematic of a circuit embodying the invention;

Fig. 2 is a side elevation of a computing unit with the panel offset and the wiring diagrammatically shown; and Fig. 3 is a geometric figure illustrating the principles of the computations carried out by the circuit shown in Fig. 1.

Referring first to Fig. 3, apparatus embodying the invention is designed to compute the solutions of algebraic equations containing variable quantities whose relationships are exactly analogous to those of elements of similar triangles as found in Euclidean geometry, and particularly the relationship between parts of similar right triangles. In the right triangle shown in Fig. 3, $$w = y \sin \theta$$
$$z = x \sin \theta$$
$$w/z = y/x$$

(1) $wx = yz$
(2) $z = wx/y$
(3) $z = x/y$ (if $w = 1$)
(4) $z = wx$ (if $y = 1$)
(5) $z = x^2/y$ (if $w = x$)
(6) $z = x^2$ (if $w = x$ and $y = 1$)
(7) $z = 1/y$ (if $w = x = 1$)
(8) $z = \sqrt{wx}$ (if $y = z$)
(9) $z = \sqrt{x}$ (if $y = z$ and $w = 1$)

The quantities indicated by letters herein will be referred to as "factors" for convenience and clarity of description.

These mathematical relationships are accurately reproduced by the circuit arrangement shown in Fig. 1, embodying two syncros 10, 11, each of the type having a single stator coil 12, 13, and a single rotor coil 14, 15. The rotors 14 and 15 are connected to and driven by the shaft 16 of an induction motor 17, and are connected so that they rotate together, as by mounting them on a single shaft 16. The syncros 10, 11 are carefully calibrated so that the angles between the rotors and stators of the two syncros will always be the same. The null position of syncro 10 as indicated herein means the relative position of the rotor and stator in which the voltage induced in stator winding 12 by rotor winding 14 is equal and opposite to the voltage from potentiometer 20 so that the net voltage applied to amplifier 19 is zero.

Induction motor 17 is connected so that one winding is energized from source 18, and the other is connected through amplifier 19 to one end of stator 12 of syncro 10, the other end being connected at terminal $w$ to a source of voltage whose value is selected for computation purposes as hereafter indicated. In the form shown, terminal $w$ is connected to a sliding contact of potentiometer 20, connected across current source 21.

One end of the rotor 14 of syncro 10 is grounded. The other end is connected at terminal $y$ to a second source of computation voltage, in this instance the sliding contact of potentiometer 22, also connected across source 21. Rotor 15 of syncro 11 is grounded at one end, the other end being connected at terminal $x$ to another source of voltage having a value selected for computation purposes, in this instance the sliding contact of another potentiometer 23. A switch 24 may be provided for connecting terminal $x$ either to potentiometer 23 or to terminal $w$, the latter switch position applying the same voltage to terminals $w$ and $x$ for reasons hereafter explained. The stator 13 of syncro 11 is grounded at one end and connected at the other end to terminal $z$. Switch 25 may be provided for connecting terminal $y$ to terminal $z$ instead of to potentiometer 22, for reasons hereafter explained.

Suitable voltage indicating means may be provided when the apparatus is used by itself without connection to other circuits, the form illustrated including voltmeters 26, 27, 28, and 29, connected across syncro windings 12, 15, 14, and 13 respectively, as shown.

The operation of this arrangement is based on the fact that in a variable transformer having a rotated coil, the stator voltage will equal the rotor voltage multiplied by the cosine of the angle by which the rotor has been displaced by rotation from the position in which its axis is perpendicular to the axis of the stator. The angle of displacement, $\theta$, is indicated diagrammatically in Fig. 1.

With this construction it will be evident from Fig. 1 that when the voltage applied at $w$ does not equal the voltage applied at $y$ multiplied by the sine of the angle $\theta$ through which the rotor 14 has been displaced, current will flow from stator 12 through amplifier 19 to motor 17 and will energize the motor, which will rotate rotors 14 and 15 until the voltage across rotor 14 reaches the indicated value, at which time no current will flow and motor 17 will stop. The voltage at terminal $z$ across stator 13 of syncro 11 will then equal the voltage at $x$ across rotor 15 multiplied by the sine of the rotor angle $\theta$.

Under these circumstances it will be evident that, in voltages, $w = y \sin \theta$ and $z = x \sin \theta$, and therefore $wx = yz$, the basic Equation 1 given above is the geometrical analysis of Fig. 3. From this equation all of the other equations enumerated in the geometrical analysis of Fig. 3 are derived by simple algebra, and can be reproduced by voltage values in the system diagrammed in Fig. 1.

For instance, when it is desired to solve Equation 2, a voltage corresponding in value to that of $w$ is applied at terminal $w$, as by turning potentiometer knob 20 until voltmeter 26 indicates the proper voltage; a voltage corresponding to the value of $x$ is applied to terminal $x$, and a voltage corresponding to the value of $y$ is applied to terminal $y$, as by the use of potentiometers 23, 22 and voltmeters 27, 28. For reasons already given, the voltage at $z$, indicated on voltmeter 29, will be the solution of Equation 2 for the selected values.

One number may be divided by another in accordance with Equation 3 in the same manner, selecting for $w$ a voltage having the value of 1. Similarly two numbers may be multiplied, as in Equation 4, by applying the proper voltage values to $w$ and $x$, and applying to $y$ a voltage equal to 1. The square of a number divided by another number can be computed according to Equation 5 by applying a voltage equivalent to the value of the number to be squared to terminals $w$ and $x$, as by throwing switch 24 to connect these terminals, and applying a voltage equal to the devisor to the terminal $y$. The square of a number can be computed as indicated in Equation 6 in the same manner, except that a voltage equal to 1 is applied to terminal $y$.

The inverse of a quantity can be computed in accordance with Equation 7 by applying a voltage corresponding to such quantity to terminal $y$, and applying to terminals $w$ and $x$ a voltage value equal to 1.

The square root of a product, Equation 8, may be obtained by applying to terminals $w$ and $x$ voltages having values corresponding to the quantities to be multiplied, and connecting terminals $y$ and $z$, as by properly positioning switch 25. The square root of a number may be similarly obtained, as in Equation 9, by applying to terminal $w$ a voltage having a value of 1, with terminals $y$ and $z$ connected. It should be pointed out that in the last two instances the voltage at terminal $y$ includes the voltage developed at terminal $z$ across syncro 13.

It should be understood, however, that the use of potentiometers 20, 22, and 23 of voltmeters 26, 27, 28, and 29 is primarily for purposes of illustration and to show the embodiment of the invention in a simple self-contained unit. Where the system is employed in a computer circuit in which the voltage values $w$, $x$ and $y$ will be derived from preceding computer elements and the resultant $z$ will be passed on to subsequent elements, said potentiometers and meters will not be necessary.

The arrangement is especially well adapted for use with syncros of standard type and particularly with "Autosyn" synchros (the registered trademark of synchros manufactured by Bendix Aviation Corporation of Teterboro, New Jersey), which can readily be arranged in coaxial alignment with their shafts and the shaft of motor 17 connected in line. Such "Autosyn" synchros have a particularly accurate null position and are reliable in operation in this type of circuit.

A convenient and compact physical embodiment of the circuit arrangement is illustrated in Fig. 2, with the panel 30 offset to the left for the sake of clarity, the ground connections being made to the grounded frame in the usual manner. The motor 17 and syncros 10 and 11 are mounted on a frame 31 carried by a base 32, with the shafts of the rotors in alignment and connected to form a single operating shaft 16. The diagrammatically shown connections between the various numbered parts will be clear from Fig. 1.

Although but one embodiment of the invention has been illustrated and described in detail, it is to be expressly understood that the invention is not limited thereto. Various changes can be made in the design, arrangement and interconnection of the parts without departing from the spirit and scope of the invention as the same will now be understood by those skilled in the art.

I claim:

1. Electrical computing apparatus comprising two variable transformers, each including a stator having a winding and a rotor having a winding, an input circuit for each winding of the first transformer arranged to apply an alternating current voltage corresponding to the value of a factor in an equation of the form $z=wx/y$, means for rotating both rotor windings until the first transformer is in null position, and an input circuit for a winding of the second transformer arranged to apply across the latter winding an alternating current voltage corresponding to the value of a factor in said equation, whereby the voltage induced across the other winding of the second transformer will have a value corresponding to the solution of the equation.

2. Electrical computing apparatus comprising two variable transformers, each including a stator having a winding and a rotor having a winding, an input circuit for each winding of the first transformer arranged to apply to each winding an alternating current voltage corresponding to the value of a factor in an equation of the form $z=wx/y$, an induction motor including a shaft in driving engagement with both rotors, a motor energizing circuit connecting a winding of the first transformer and the motor and rotating the rotors until the first transformer reaches null position, and an input circuit for a winding of the second transformer arranged to apply across the latter winding an alternating current voltage corresponding to a factor of said equation, whereby the voltage induced across the other winding of the second transformer will have a value corresponding to the solution of the equation.

3. Electrical computing apparatus for providing solutions to equations, comprising two syncros adapted to be energized by an alternating current source, each including a stator having a winding and a rotor having a winding, each rotor being mounted on a shaft, a motor having a shaft, driving connections between the motor shaft and the rotor shafts arranged to maintain the same angle between each rotor and stator; and a motor energizing circuit connecting a winding of only one syncro with the motor and arranged to energize and operate the motor until the circuit-connected syncro is in null position and the other synchro provides an output corresponding to the solution.

4. Electrical computing apparatus as claimed in claim 3, in which the motor and syncros are coaxially arranged with the shafts connected end to end to form an integral drive shaft.

5. Electrical computing apparatus as claimed in claim 1, including means for connecting a winding of one transformer and a winding of the other transformer to the same voltage source.

6. Electrical computing apparatus for solving an equation of the form $z=wx/y$, comprising a first variable transformer having a pair of relatively movable inductances with one of its inductances connected to a first alternating voltage source having a value corresponding to one factor of the equation, and having its other inductance adapted for energization by an alternating voltage corresponding to another factor of the equation, a second variable transformer having a pair of relatively movable inductances with one of its inductances connected to an alternating voltage source having a value corresponding to a factor of the equation, means for relatively moving the inductances of the first transformer to null position and for relatively moving the inductances of the second transformer to a corresponding angular position, whereby the induced voltage across the other inductance of the second transformer corresponds to the solution of the equation.

7. Electrical computing apparatus as described in claim 6 including means for connecting the other inductance of the first variable transformer to an alternating voltage source having a value corresponding to a factor of the equation.

8. Electrical computing apparatus as described in claim 6 including means for connecting the other inductance of the first variable transformer to the other inductance of the second variable transformer for energization thereby.

9. Electrical computing apparatus as described in claim 6 including means for connecting one of the inductances of the first variable transformer and one of the inductances of the second variable transformer to a common voltage source, whereby two factors of the equation are identical with each other.

10. Electrical computing apparatus as described in claim 6 in which the equation is in the form $z=wx/y$, including means for applying voltages equivalent to $w$ and $y$ to the inductances of the first transformer and for applying voltages equivalent to $x$ to an inductance of the second transformer, whereby the voltage induced across the other inductance of the second transformer is equivalent to a $z$ when the first transformer is in null position.

11. Electrical computing apparatus as described in claim 6 in which the equation is in the form $z=x/z$, inculding means for applying voltages equivalent to 1 and $y$ to the inductances of the first transformer and for applying a voltage equivalent to $x$ to an inductance of the second transformer, whereby the voltage induced across the other inductance of the second transformer is equivalent to $z$ when the first transformer is in null position.

12. Electrical computing apparatus as described in claim 6 in which the equation is in the form $z=wx$, including means for applying voltages equivalent to $w$ and 1 to the inductances of the first transformer and for applying a voltage equivalent to $x$ to an inductance of the second transformer, whereby the voltage induced across the other inductance of the second transformer is equivalent to $z$ when the first transformer is in null position.

13. Electrical computing apparatus as described in claim 6 in which the equation is in the form $z=x^2/y$, including means for applying voltages equivalent to $x$ and $y$ to the inductances of the first transformer and for applying a voltage equivalent to $x$ to the inductance of the second transformer, whereby the voltage induced in the other inductance of the second transformer is equivalent to $z$ when the first transformer is in null position.

14. Electrical computing apparatus as described in claim 6 in which the equation is in the form $z=x^2$, including means for applying a voltage equivalent to $x$ and 1 to the inductances of the first transformer and for applying a voltage equivalent to $x$ to one inductance of the second transformer, whereby the voltage across the other inductance of the second transformer is equivalent to $z$ when the first transformer is in null position.

15. Electrical computing apparatus as described in claim 6 in which the equation is in the form $z=1/y$, including means for applying voltages equivalent to 1 and $y$ to the inductances of the first transformer and for applying a voltage equivalent to 1 to an inductance of the second transformer, whereby the voltage induced in the other inductance of the second transformer is equivalent to $z$ when the first transformer is in null position.

16. Electrical computing apparatus as described in claim 6 in which the equation is in the form $z=\sqrt{wx}$, including means for applying a voltage equivalent to $w$ to one inductance of the first transformer and for applying a voltage equivalent to 1 to an inductance of the second transformer, means for connecting the other inductance of the second transformer to the other inductance of the first transformer so that the voltage induced in the other inductance of the second transformer is applied to the other inductance of the first transformer, whereby the voltage induced in the other inductance of the second transformer is equivalent to $z$ when the first transformer is in null position.

17. Electrical computing apparatus as described in claim 6 in which the equation is in the form $z=\sqrt{x}$, including means for applying a voltage equivalent to 1 to one inductance of the first transformer and for applying a voltage equivalent to $x$ to one inductance of the second transformer, means for connecting the other inductance of the second transformer to the other inductance of the first transformer so that the voltage induced in the other inductance of the second transformer is applied to the other inductance of the first transformer, whereby the voltage induced in the other inductance of the second transformer is equivalent to $z$ when the first transformer is in null position.

References Cited in the file of this patent

UNITED STATES PATENTS

| | | |
|---|---|---|
| 1,677,378 | Albrecht | July 17, 1928 |
| 2,428,800 | Holden | Oct. 14, 1947 |
| 2,465,624 | Agins | Mar. 29, 1949 |
| 2,467,179 | Andersen | Apr. 12, 1949 |
| 2,467,646 | Agins | Apr. 19, 1949 |
| 2,794,594 | Ergen et al. | June 4, 1957 |

OTHER REFERENCES

National Defense Research Committee, Division 14, Report 435, Aug. 7, 1944, pages 11 and 12 relied on.

Bell: "Some Aspects of Electrical Computing," Electrical Engineering, vol. 22, No. 281, July 1951, pp. 264–269.

Electric Analog Computers (Korn and Korn), published by McGraw-Hill Book Company, New York, 1952, pages 220 to 222.